(12) United States Patent
Uchida et al.

(10) Patent No.: US 8,189,227 B2
(45) Date of Patent: May 29, 2012

(54) IMAGE FORMING APPARATUS, IMAGE FORMING METHOD, AND COMPUTER-READABLE RECORDING MEDIUM STORING IMAGE FORMING PROGRAM

(75) Inventors: Fukutoshi Uchida, Kanagawa (JP); Yuzo Oshima, Tokyo (JP); Masateru Kumagai, Kanagawa (JP); Tatsushi Machida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1089 days.

(21) Appl. No.: 11/857,204

(22) Filed: Sep. 18, 2007

(65) Prior Publication Data

US 2008/0068657 A1 Mar. 20, 2008

(30) Foreign Application Priority Data

Sep. 19, 2006 (JP) .................... 2006-253507

(51) Int. Cl.
*G06K 15/00* (2006.01)
*G06F 3/12* (2006.01)
*G06F 15/00* (2006.01)
*G06F 9/26* (2006.01)
*G06F 15/16* (2006.01)
*G06F 9/46* (2006.01)
*H04N 1/00* (2006.01)
*H04N 5/76* (2006.01)

(52) U.S. Cl. ...... 358/1.16; 358/1.15; 358/404; 358/1.13; 358/1.18; 358/1.2; 711/203; 709/232; 718/100; 348/231.1

(58) Field of Classification Search .................. 358/1.16, 358/404, 1.13, 1.18; 711/203; 709/232; 345/534; 718/100
See application file for complete search history.

(56) References Cited

U.S. PATENT DOCUMENTS

| 5,349,449 | A | 9/1994 | Omi et al. |
| 5,963,337 | A | 10/1999 | Inui et al. |
| 6,288,791 | B1 | 9/2001 | Minamizawa |
| 6,340,973 | B1 * | 1/2002 | Ochiai et al. .................. 345/534 |
| 6,538,692 | B2 | 3/2003 | Niwa |
| 6,724,495 | B1 | 4/2004 | Morisaki |
| 7,228,081 | B2 | 6/2007 | Hasegawa et al. |

(Continued)

FOREIGN PATENT DOCUMENTS

CN 1192555 A 9/1998

(Continued)

OTHER PUBLICATIONS

Office Action issued Apr. 5, 2011, in Japanese Patent Application No. 2006-253507.

(Continued)

*Primary Examiner* — Charlotte M Baker
*Assistant Examiner* — Rury Grisham
(74) *Attorney, Agent, or Firm* — Oblon, Spivak, McClelland, Maier & Neustadt, L.L.P.

(57) ABSTRACT

An image forming apparatus is disclosed. The image forming apparatus includes plural image output units, plural output image data converting units disposed for the corresponding image output units for converting image data of a predetermined format into image data of a format for the corresponding image output units, a first memory unit which is used in common for storing image data in processes by the image output units and the output image data converting units, and a memory area adjusting unit which adjusts a memory area in the first memory unit for memory area obtaining requests from the image output units and the output image data converting units.

20 Claims, 10 Drawing Sheets

U.S. PATENT DOCUMENTS

| | | |
|---|---|---|
| 2004/0190037 A1 | 9/2004 | Shindoh |
| 2007/0047015 A1* | 3/2007 | Yamada ................... 358/404 |
| 2010/0220348 A1* | 9/2010 | Matsushima ............. 358/1.13 |

FOREIGN PATENT DOCUMENTS

| | | |
|---|---|---|
| JP | 3-191452 | 8/1991 |
| JP | 10-74163 | 3/1998 |
| JP | 2002-165050 | 6/2002 |
| JP | 2002-196903 | 7/2002 |
| JP | 2003-8797 | 1/2003 |
| JP | 2004-220579 | 8/2004 |
| JP | 2004-272021 | 9/2004 |
| JP | 2004-297161 | 10/2004 |
| JP | 2004-347627 | 12/2004 |

OTHER PUBLICATIONS

Office Action issued Jun. 28, 2011, in Japan Patent Application No. 2006-253507.

* cited by examiner

IMAGE FORMING APPARATUS, IMAGE FORMING METHOD, AND COMPUTER-READABLE RECORDING MEDIUM STORING IMAGE FORMING PROGRAM

BACKGROUND OF THE INVENTION

1. Field of the Invention

The present invention generally relates to an image forming apparatus, an image forming method, and a computer-readable recording medium storing an image forming program.

2. Description of the Related Art

Conventionally, in an image forming apparatus having plural functions, resources are provided which resources are used in common by the plural functions, and the resources are managed by the image forming apparatus. With this, the cost of the image forming apparatus is reduced. Especially, since the cost of a memory unit is high, when the memory unit is used in common by the plural functions, the cost of the image forming apparatus can be reduced.

In Patent Document 1, a digital copying apparatus is disclosed. In the digital copying apparatus, plural pieces of application software share a memory unit as a common resource by an adjustment of a system controller. Printer application software and facsimile application software store corresponding image data in corresponding page memories, and send the image data to a common memory unit. However, when one of the application software pieces uses the common memory unit, the other application software cannot use the common memory unit. That is, the plural pieces of the application software cannot be executed in parallel. Therefore, the processing speed of the digital copying apparatus is lower than the processing speed of an image forming apparatus having a memory unit for individual application software.

In order to solve the above problem, in Patent Document 2, an image forming apparatus is disclosed. In the image forming apparatus, a memory area for individual application software in a common memory unit is adjusted by matching the processing speed of the application software.

[Patent Document 1] Japanese Laid-Open Patent Application No. 10-074163

[Patent Document 2] Japanese Laid-Open Patent Application No. 2002-196903

However, in Patent Documents 1 and 2, the common memory unit is used for storing image data after being applied to a process by the application software, and an individual memory unit is also provided for the application software for processing an individual process. The individual memory unit cannot be used in common. Consequently, too many memory units are provided in the apparatus.

SUMMARY OF THE INVENTION

In a preferred embodiment of the present invention, there is provided an image forming apparatus, an image forming method, and a computer-readable recording medium storing an image forming program in which one memory unit is simultaneously used in common when plural processes are executed and the cost of the memory unit in the image forming apparatus is reduced by decreasing redundancy in memory areas in the memory unit.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image forming apparatus, an image forming method, and a computer-readable recording medium storing an image forming program particularly pointed out in the specification in such full, clear, concise, and exact terms so as to enable a person having ordinary skill in the art to practice the invention.

To achieve one or more of these and other advantages, according to one aspect of the present invention, there is provided an image forming apparatus. The image forming apparatus includes plural image output units, plural output image data converting units disposed for the corresponding image output units for converting image data of a predetermined format into image data of a format for the corresponding image output units, a first memory unit which is used in common for storing image data in processes by the image output units and the output image data converting units, and a memory area adjusting unit which adjusts a memory area in the first memory unit for memory area obtaining requests from the image output units and the output image data converting units.

According to another aspect of the present invention, there is provided an image forming method in an image forming apparatus. The image forming apparatus includes plural image output units, plural output image data converting units disposed for the corresponding image output units, a first memory unit which is used in common for storing image data in processes by the image output units and the output image data converting units, and a memory area adjusting unit which adjusts a memory area in the first memory unit for memory area obtaining requests from the image output units and the output image data converting units. The image forming method includes an output image data converting step which converts image data of a predetermined format into image data of a format for the image output unit by the output image data converting unit, and a memory area adjusting step which adjusts a memory area in the first memory unit for memory area obtaining requests from the image output units and the image data converting units by the memory area adjusting unit.

According to another aspect of the present invention, there is provided a computer-readable recording medium storing an image forming program in an image forming apparatus. The image forming apparatus includes plural image output units, plural output image data converting units disposed for the corresponding image output units, a first memory unit which is used in common for storing image data in processes by the image output units and the output image data converting units, and a memory area adjusting unit which adjusts a memory area in the first memory unit for memory area obtaining requests from the image output units and the output image data converting units. The image forming program includes an output image data converting step which converts image data of a predetermined format into image data of a format for the image output unit by the image data converting unit, and a memory area adjusting step which adjusts a memory area in the first memory unit for memory area obtaining requests from the image output units and the output image data converting units by the memory area adjusting unit.

EFFECT OF THE INVENTION

According to an embodiment of the present invention, in an image forming apparatus, since one memory unit is simultaneously used in common when plural processes are executed, the cost of the memory unit in the image forming apparatus can be reduced by decreasing redundancy in memory areas in the memory unit.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENT

Best Mode of Carrying Out the Invention

The best mode of carrying out the present invention is described with reference to the accompanying drawings.

[Basic Structure of Image Forming Apparatus]

Figure 1:
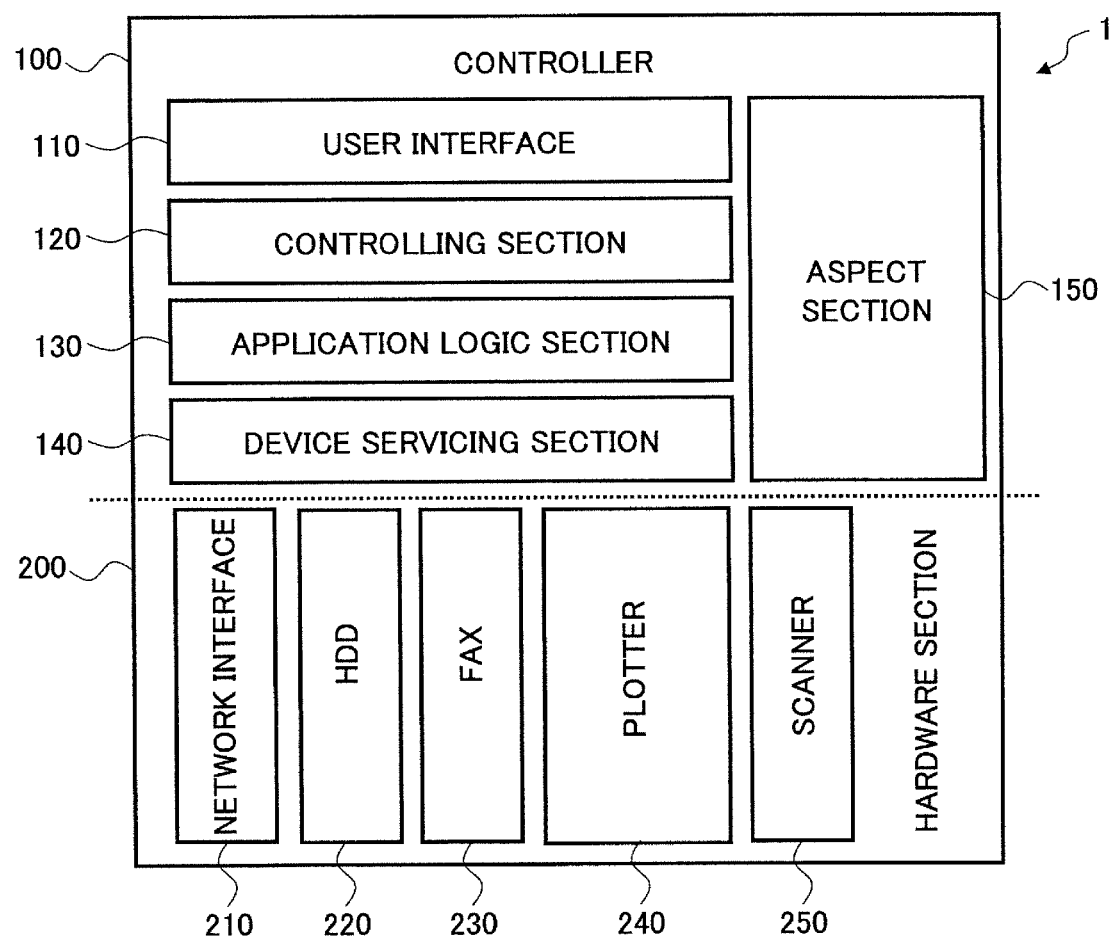
FIG. 1 is a diagram showing a basic structure of an image forming apparatus according to an embodiment of the present invention.

FIG. 1 is a diagram showing a basic structure of an image forming apparatus 1 according to an embodiment of the present invention. The image forming apparatus 1 includes plural input units and plural output units, and executes plural jobs by combining functions in the image forming apparatus 1. As shown in FIG. 1, the image forming apparatus 1 includes a controller 100 which controls elements in the image forming apparatus 1 and executes processes such as an image data conversion process, and a hardware section 200 which executes processes such as an image inputting process by a scanner 250 and an image outputting process by a plotter 240.

The controller 100 includes a user interface section 110, a controlling section 120, an application logic section 130, a device servicing section 140, and an aspect section 150.

The user interface section 110 includes an operating panel and a user inputs an instruction to the image forming apparatus 1 on the operating panel. In addition, the user interface section 110 displays operating conditions of the image forming apparatus 1 on the operating panel. Further, the user interface section 110 can receive an instruction input by an external device via a network and can display operating conditions of the image forming apparatus 1 on a display connected via the network.

The controlling section 120 selects a function for executing a job based on a job instruction input by the user interface section 110 and controls a unit for executing the function. The controlling section 120 can determine the order of processes of plural jobs based on the operating conditions of the units which the image forming apparatus 1 includes.

The application logic section 130 includes processing sections which mainly execute image processes in the image forming apparatus 1. The processing sections execute the processes by being controlled by the controlling section 120.

The device servicing section 140 receives a request to operate hardware from each processing section in the application logic section 130 and outputs an instruction to the hardware.

The aspect section 150 has a function which executes common processes in the user interface section 110 through the device servicing section 140. The common processes are, for example, an accessing process to the user interface section 110 through the device servicing section 140, an operating history forming process of the image forming apparatus 1, and a charging process to a user.

The hardware section 200 includes plural image input units and plural image output units, for example, a network interface 210, an HDD (hard disk drive) 220, a facsimile machine 230 (FAX), the plotter 240, and the scanner 250.

The network interface 210 includes a function which transmits image data to an external device (not shown) connected via a network (data transmitting function) and a function which transmits image data to an e-mail address by attaching the image data to the e-mail (mail transmitting function). The HDD 220 stores image data. In addition, the HDD 22 can store a program which is executed by a controlling unit (not shown) of the image forming apparatus 1.

The FAX 230 receives/transmits image data from/to another facsimile machine (not shown). The plotter 240 forms an image on a recording medium. The scanner 250 reads an image on a recording medium.

[Functions of Image Forming Apparatus]

Figure 2:
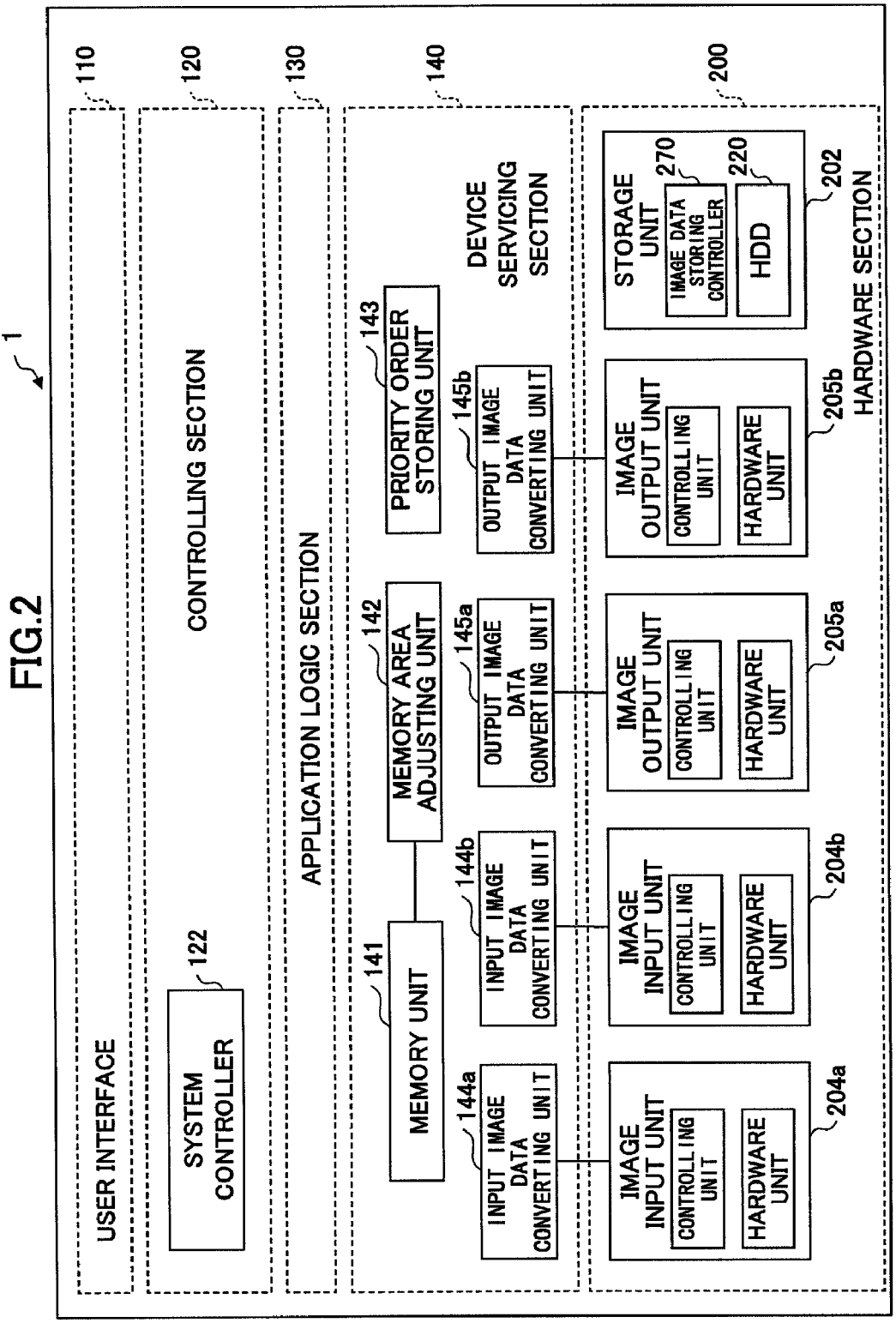
FIG. 2 is a diagram showing functions of the image forming apparatus according to the embodiment of the present invention.

FIG. 2 is a diagram showing functions of the image forming apparatus 1 according to the embodiment of the present invention. In FIG. 2, the aspect section 150 shown in FIG. 1 does not directly relate to the embodiment of the present invention. Therefore, the aspect section 150 is omitted in FIG. 2.

In addition, according to the present embodiment, the functions in the image forming apparatus 1 are included in the controlling section 120, the device servicing section 140, and the hardware section 200. Therefore, the description of the functions of the user interface 110 and the application logic section 130 is omitted.

As shown in FIG. 2, the hardware section 200 includes image input units 204a and 204b, image output units 205a and 205b, and a storage unit 202. That is, the hardware section 200 includes the plural image input units 204a and 204b, and the plural image output units 205a and 205b.

Each of the image input units 204a and 204b and the image output units 205a and 205b includes a controlling unit and a hardware unit. The storage unit 202 includes an image data storing controller 270 (described below) and the HDD 220. Image data are input/output to/from the hardware unit. The hardware unit is, for example, a scanner, a plotter, a facsimile machine, and a network interface. In each of the image input units 204a and 204b and the image output units 205a and 205b, the controlling unit controls the hardware unit.

In the following, in some cases, when a suffix is not attached to a reference number of an element, the reference number represents the set of elements. For, example, the image input unit 204 represents the image input units 204a and 204b.

In FIG. 2, the scanner 250 shown in FIG. 1 can correspond to, for example, the hardware unit in the image input unit 204a, the plotter 240 shown in FIG. 1 can correspond to, for example, the hardware unit in the image output unit 205a. Further, the network interface 210 and the FAX 230 shown in FIG. 1 can correspond to, for example, the image input unit 204b and the image output unit 205b.

In FIG. 2, the number of the image input units 204 is two; however, the number is not limited to two, and the number of the image input units 204 can be two or more. Further, the number of the image output units 205 is two; however, the number is not limited to two, and the number of the image output units 205 can be two or more.

The storage unit 202 stores image data input from the image input units 204a and 204b. The storage unit 202 can store image data to be output from the image output units 205a and 205b.

In addition, the storage unit 202 can store a program which is executed by the image forming apparatus 1.

The device servicing section 140 includes a memory unit 141 (first memory unit), a memory area adjusting unit 142, a priority order storing unit 143, input image data converting units 144a and 144b, and output image data converting units 145a and 145b. That is, the device servicing section 140 includes the plural input image data converting units 144a and 144b, and the plural output image data converting units 145a and 145b.

In FIG. 2, the number of the input image data converting units 144 is two; however, the number is not limited to two, and the number of the input image data converting units 144 can be two or more corresponding to the number of the image input units 204. Further, the number of the output image data converting units 145 is two; however, the number is not limited to two, and the number of the output image data converting units 145 can be two or more corresponding to the number of the image output units 205.

The memory unit 141 gives a memory area to each of the input image data converting units 144a and 144b and the output image data converting units 145a and 145b when an image data converting process is executed. In addition, the memory unit 141 can give a memory area to each of the image input units 204a and 204b, and the image output units 205a and 205b when an image input/output process is executed. The memory unit 141 can be a unit from which image data are output or to which image data are input at high speed.

The memory area adjusting unit 142 adjusts a request for obtaining a memory area in the memory unit 141, when each of the input image data converting units 144a and 144b, the output image data converting units 145a and 145b, the image input units 204a and 204b, and the image output units 205a and 205b requests to obtain a memory area in the memory unit 141. The memory area adjusting unit 142 compares a requested memory area with a free memory area in the memory unit 141, and when the free memory area is equal to or greater than the requested memory area, the memory area adjusting unit 142 gives the requested memory area to the unit requested the memory area.

When the free memory area is less than the requested memory area, the memory area adjusting unit 142 can inform the unit requesting the memory area that the free memory area is less than the requested memory area.

The priority order storing unit 143 stores the priority order by which the requested memory area is given to units by priority. That is, the priority order storing unit 143 can store the priority order for the input image data converting units 144a and 144b, the output image data converting units 145a and 145b, the image input units 204a and 204b, and the image output units 205a and 205b. For example, the priority order storing unit 143 stores the first priority for an input image data converting unit, an output image data converting unit, an image input unit, and an image output unit of a scanner and a plotter for realizing a copying job. The priority order can be determined in the input image data converting units 144a and 144b, the output image data converting units 145a and 145b, the image input units 204a and 204b, and the image output units 205a and 205b. In addition, for example, the priority order can be determined as the image input units 204a and 204b have priority over the image output units 205a and 205b. The image forming apparatus 1 executes a job based on the priority order stored in the priority order storing unit 143.

The input image data converting units 144a and 144b convert image data input from the corresponding image input units 204a and 204b into image data of a predetermined format. In this, the input image data converting unit 144a corresponds to the image input unit 204a, and the input image data converting unit 144b corresponds to the image input unit 204b. The predetermined format is one format. With this, the structure of each unit in the image forming apparatus 1, especially, in the application logic section 130 is simplified.

The output image data converting units 145a and 145b convert the image data of the predetermined format into image data of a format designated by the corresponding image output units 205a and 205b. In this, the output image data converting unit 145a corresponds to the image output unit 205a, and the output image data converting unit 145b corresponds to the image output unit 204b. For example, image data of a predetermined format are converted into image data of a network interface format corresponding to an external device connected to the network interface 210.

Input image data of a format are converted into image data of a predetermined format by the input image data converting unit 144, and the image data of the predetermined format are converted into image data of a format for the image output unit 205 by the output image data converting unit 145.

The input image data converting units 144a and 144b, and the output image data converting units 145a and 145b can be disposed in the application logic section 130 instead of in the device servicing section 140.

As shown in FIG. 2, the controlling section 120 includes a system controller 122. The system controller 122 controls elements in the image forming apparatus 1. The system controller 122 selects a job executing unit from the application logic section 130 based on an instruction from the user interface section 110, and controls the selected job executing unit.

When a job of inputting or outputting image data is executed, the system controller 122 outputs an instruction to the input image data converting unit 144a or 144b, or the output image data converting unit 145a or 145b in the device servicing section 140 so that the image data of the predetermined format are converted into image data of a designated format. When the job is to output image data, the system controller 122 outputs a request to the memory area adjusting unit 142 so that a memory area is obtained for a process in the output image data converting unit 145a or 145b. When the system controller 122 receives a response that the memory area is obtained from the memory area adjusting unit 142, the system controller 122 instructs the output image data converting unit 145a or 145b to converts the image data. With this, the system controller 122 can instruct the output image data converting unit 145a or 145b to convert the image data corresponding to the free memory area of the memory unit 141. Similarly, the system controller 122 instructs the memory area adjusting unit 142 to obtain a memory area for the image output unit 205a or 205b.

When the job is to input image data, the system controller 122 outputs a request to the memory area adjusting unit 142 so that a memory area is obtained for a process in the input image data converting unit 144a or 144b. When the system controller 122 receives a response that the memory area is obtained from the memory area adjusting unit 142, the system controller 122 instructs the input image data converting unit 144a or 144b to convert the image data. With this, the system controller 122 can instruct the input image data converting unit 144a or 144b to convert the image data corresponding to the free memory area of the memory unit 141. Before the above process, the system controller 122 instructs the memory area adjusting unit 142 to obtain a memory area for the image input unit 204a or 204b.

The system controller 122 can instruct the memory area adjusting unit 142 to obtain a memory area based on the priority order stored in the priority order storing unit 143. In addition, the system controller 122 can give priority for the input image data converting unit 144a or 144b and the corresponding image input unit 204a or 204b over the output image data converting unit 145a or 145b and the corresponding image output unit 205a or 205b; and vice versa.

When the memory area cannot be obtained for the image output unit 205, the system controller 122 can instruct the memory area adjusting unit 142 to free up the memory area used by the output image data converting unit 145, because, the converted image data have been transferred to the storage unit 202. With this, the image output unit 205 can obtain a memory area in the memory unit 141.

In addition, the priority order storing unit 143 can be disposed in the controlling section 120 instead of in device servicing section 140. In this case, the system controller 122 requests the memory unit 141 to obtain a memory area by referring to the priority order stored in the priority order storing unit 143.

[Job Control Based on Memory Using Conditions]

Figure 3:
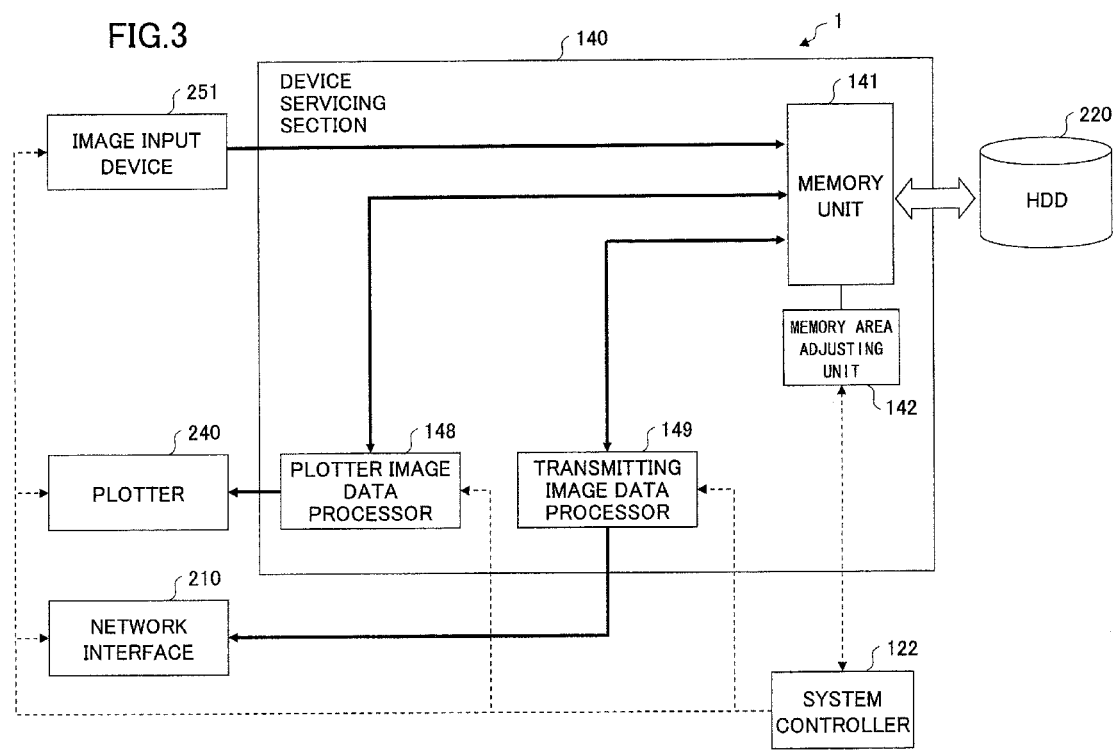
FIG. 3 is a diagram showing job control based on memory using conditions in the image forming apparatus according to the embodiment of the present invention.

Next, referring to FIG. 3, job control based on memory using conditions is described.

FIG. 3 is a diagram showing job control based on memory using conditions in the image forming apparatus 1. In FIG. 3, the continuous arrow lines show flows of image data, and the dashed arrow lines show control signals.

As shown in FIG. 3, the image forming apparatus 1 includes the device servicing section 140, an image input device 251, the plotter 240, the network interface 210, the system controller 122, and the HDD 220 (second memory unit). The image input device 251 corresponds to the hardware unit in the image input unit 204 shown in FIG. 2.

The device servicing section 140 includes the memory unit 141, the memory area adjusting unit 142, a plotter image data processor 148, and a transmitting image data processor 149. The plotter image data processor 148 and the transmitting image data processor 149 correspond to the output image data converting unit 145 shown in FIG. 2, respectively.

The memory unit 141 gives a memory area to the plotter image data processor 148 (145) and the transmitting image data processor 149 (145) when the plotter image data processor 148 and the transmitting image data processor 149 execute corresponding image processes. The memory area in the memory unit 141, which is given to the plotter image data processor 148 and the transmitting image data processor 149, is used when image data are converted into image data of a format which matches a format of the plotter 240 or the network interface 210. In addition, a memory area in the memory unit 141 can be used for a process in the image input device 251.

When the memory area adjusting unit 142 receives a request to obtain a memory area in the memory unit 141, the memory area adjusting unit 142 compares the size of the requested memory area with the size of the free memory area in the memory unit 141. When the size of the free memory area is equal to or greater than the size of the requested memory area, the memory area adjusting unit 142 sends a response signifying that the memory area is obtained to the system controller 122.

The plotter image data processor 148 converts the image data of the predetermined format into image data of a format which matches the plotter 240. The transmitting image data processor 149 converts the image data of the predetermined format into image data of a format which matches the network interface 210. Elements in the image forming apparatus 1 mainly process the image data of the predetermined format; however, the image forming apparatus 1 outputs image data of a format different from the predetermined format. Therefore, the plotter image processor 148 and the transmitting image data processor 149 convert the image data of the predetermined format into image data of formats corresponding to the plotter 240 and the network interface 210, respectively.

In addition, elements in the image forming apparatus 1 can execute, for example, to enlarge or reduce an image, or to correct a color in the image.

Image data are input to the image input device 251 of the image forming apparatus 1. The image input device 251 is, for example, the scanner 250, or the network interface 210.

The plotter 240 forms an image on a recording medium. The network interface 210 outputs image data, for example, to an e-mail address by e-mail transmission, or to a personal computer via a network.

The system controller 122 controls elements (sections) in the image forming apparatus 1. The system controller 122 selects the plotter image data processor 148 or the transmitting image data processor 149 corresponding to a job and requests the memory area adjusting unit 142 to obtain a memory area in the memory unit 141 for executing the job in the plotter image data processor 148 or the transmitting image data processor 149. When the system controller 122 receives a response that the memory area is obtained from the memory area adjusting unit 142, the system controller 122 instructs the plotter image data processor 148 or the transmitting image data processor 149 to execute the job.

Similarly, the system controller 122 selects the plotter 240 or the network interface 210 corresponding to a job and requests the memory area adjusting unit 142 to obtain a memory area in the memory unit 141 for executing the job in the plotter 240 or the network interface 210. When the system controller 122 receives a response that the memory area is obtained from the memory area adjusting unit 142, the system controller 122 instructs the plotter 240 or the network interface 210 to execute the job.

In addition, when image data are input from the image input device 251, the system controller 122 requests the memory area adjusting unit 142 to obtain a memory area in the memory unit 141 for the input image data. The system controller 122 can give priority for obtaining a memory area to the input image data over other requests to obtain a memory area. In this case, the input image data are stored in the memory unit 141 with priority over the other image data.

The HDD 220 stores image data input from the image input device 251 and converted image data. The predetermined format is, for example, the RGB format; however, another format can be used as the predetermined format. As the predetermined format, a format is preferable to which an irreversible data compression be not applied, and a format is more preferable to which compression be not applied.

As described above, the plotter image data processor 148 converts image data of a predetermined format into image data of a format matching the plotter 240, and the transmitting image data processor 149 converts image data of a predetermined format into image data of a format matching the network interface 210. The HDD 220 stores the converted image data. With this, since the converted image data applied to the processes can be transferred to the HDD 220, the memory area in the memory unit 141 where the processed image data have been stored can be made free and the memory unit 141 can be effectively utilized.

[Physical Structure of Image Forming Apparatus]

Figure 4:
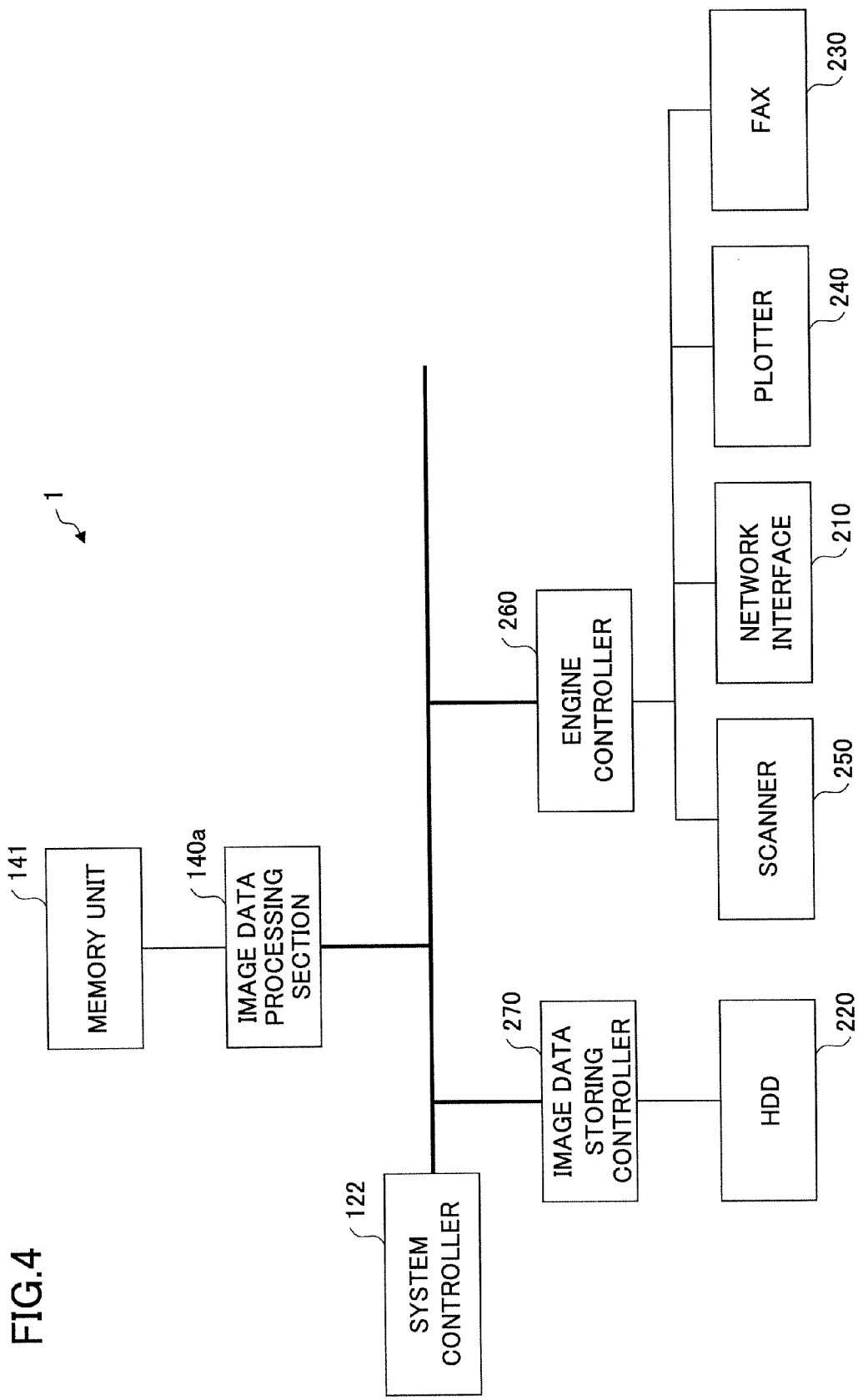
FIG. 4 is a diagram showing a physical structure of the image forming apparatus according to the embodiment of the present invention.

FIG. 4 is a diagram showing a physical structure of the image forming apparatus 1.

As shown in FIG. 4, the image forming apparatus 1 includes the memory unit 141, an image data processing section 140a, the system controller 122, the image data storing controller 270, an engine controller 260, the HDD 220, the scanner 250, the network interface 210, the plotter 240, and the FAX 230. The image data processing section 140a corresponds to the input image data converting unit 144 and the output image data converting unit 145 shown in FIG. 2. The engine controller 260 corresponds to the controlling units in the image input unit 204 and the image output unit 205.

The image data processing section 140a converts image data input to the image forming apparatus 1 into image data of a predetermined format, and converts the image data of the predetermined format into image data of a format matching the format of an image outputting device, for example, the plotter 240. The image data processing section 140a can have a function for enlarging/reducing an image, and can be formed of an LSI.

The image data storing controller 270 controls image data to be stored in the HDD 220 and image data to be output from the HDD 220. The engine controller 260 controls hardware such as the scanner 250, the network interface 210, the plotter 240, and the FAX 230. The engine controller 260 can be a device driver for driving the hardware.

The system controller 122 controls elements in the image forming apparatus 1.

[Processes in Image Forming Apparatus]

Next, referring to FIGS. 5 through 9, processes in the image forming apparatus 1 are described.

[Image Data Reading Processes and Image Data Storing Processes]

Figure 5:
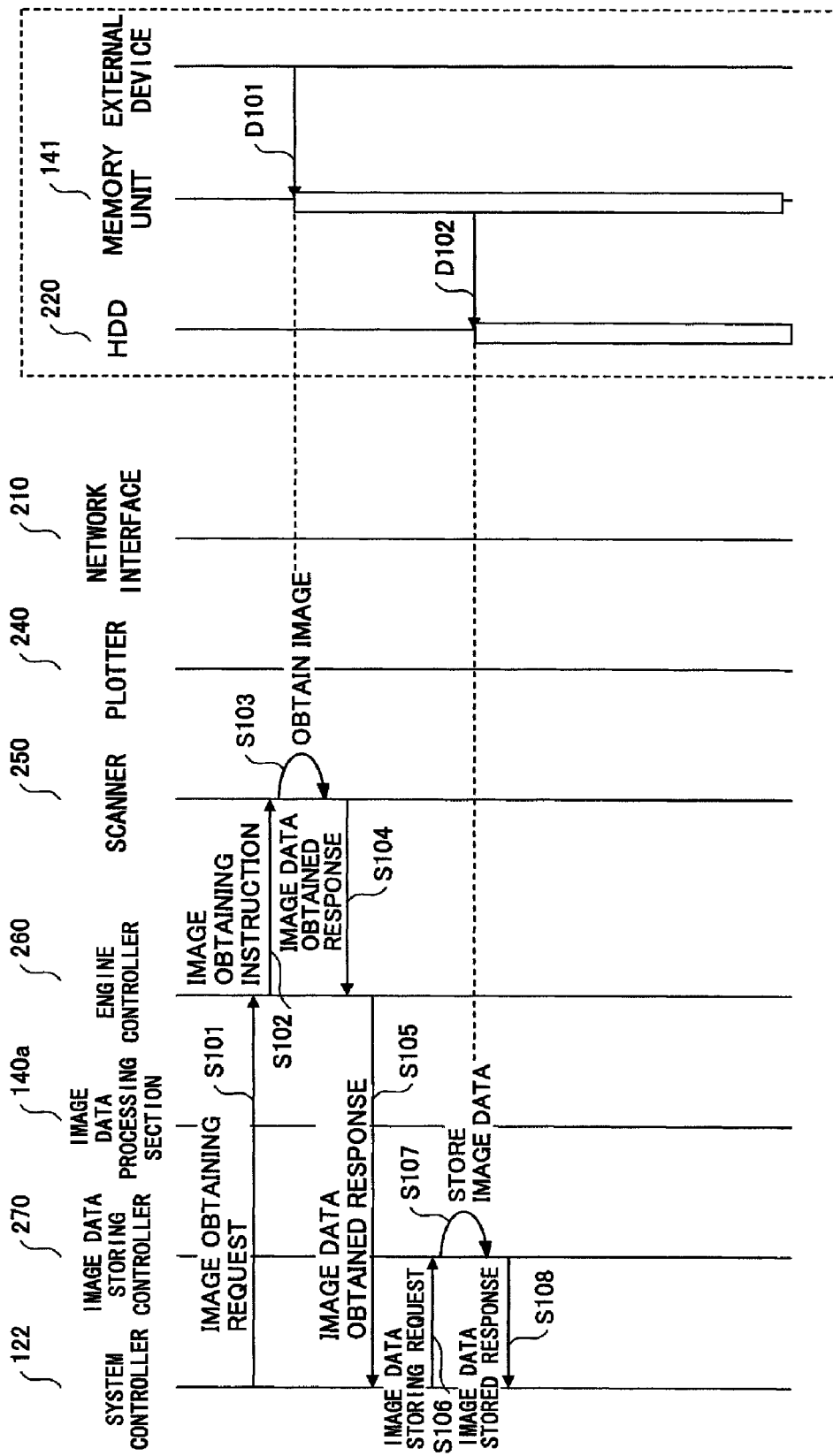
FIG. 5 is a sequence chart showing image data reading processes and image data storing processes in the image forming apparatus according to the embodiment of the present invention.

FIG. 5 is a sequence chart showing image data reading processes and image data storing processes in the image forming apparatus 1. In FIG. 5, image data are read by the scanner 250 and the read image data are converted into image data of a predetermined format and the converted image data are stored in the HDD 220. In addition, in FIG. 5, a part surrounded by a dashed line shows image data transferring processes.

Referring to FIG. 5, the image data reading processes and the image data storing processes are described.

First, the system controller 122 sends an image obtaining request to the engine controller 260 (S101). The system controller 122 sends the image obtaining request based on an instruction of a user, for example, on an operating panel (not shown) of the image forming apparatus 1. The instruction is, for example, "scan a document".

The engine controller 260 sends an image obtaining instruction to the scanner 250 based on the image obtaining request (S102). The scanner 250 obtains image data of an image by optically reading the image (S103). That is, an image on a recording medium (external device) is stored in the memory unit 141 as image data by the scanner 250 (D101).

The scanner 250 sends an image data obtained response signifying that image data are obtained to the engine controller 260 (S104). The engine controller 260 sends an image data obtained response signifying that image data are obtained to the system controller 122 (S105).

The system controller 122 sends an image data storing request to the image data storing controller 270 so that the image data being stored in the memory unit 141 are transferred to the HDD 220 (S106). The image data storing controller 270 transfers the image data being stored in the memory unit 141 to the HDD 220 (D102). A memory area where the image data have been stored in the memory unit 141 can be a free memory area after storing the image data in the HDD 220.

The image data storing controller 270 sends an image data stored response signifying that the image data are stored in the HDD 220 to the system controller 122 (S108).

By the processes from S101 through S108, an image on a recording medium is read by the scanner 250 and image data of the read image are stored in the HDD 220. When the format of the image data obtained in S103 is different from a predetermined format, the system controller 122 sends an input image data converting request, which requests the image data processing section 140a to convert the obtained image data into image data of the predetermined format, to the image data processing section 140a after the process in S105. The image data processing section 140a converts the image data of the format into the image data of the predetermined format and stores the converted image data in the HDD 220 by the processes S106 and S107.

[Image Data Plotting Processes and Image Data Network Transmitting Processes]

Figure 6:
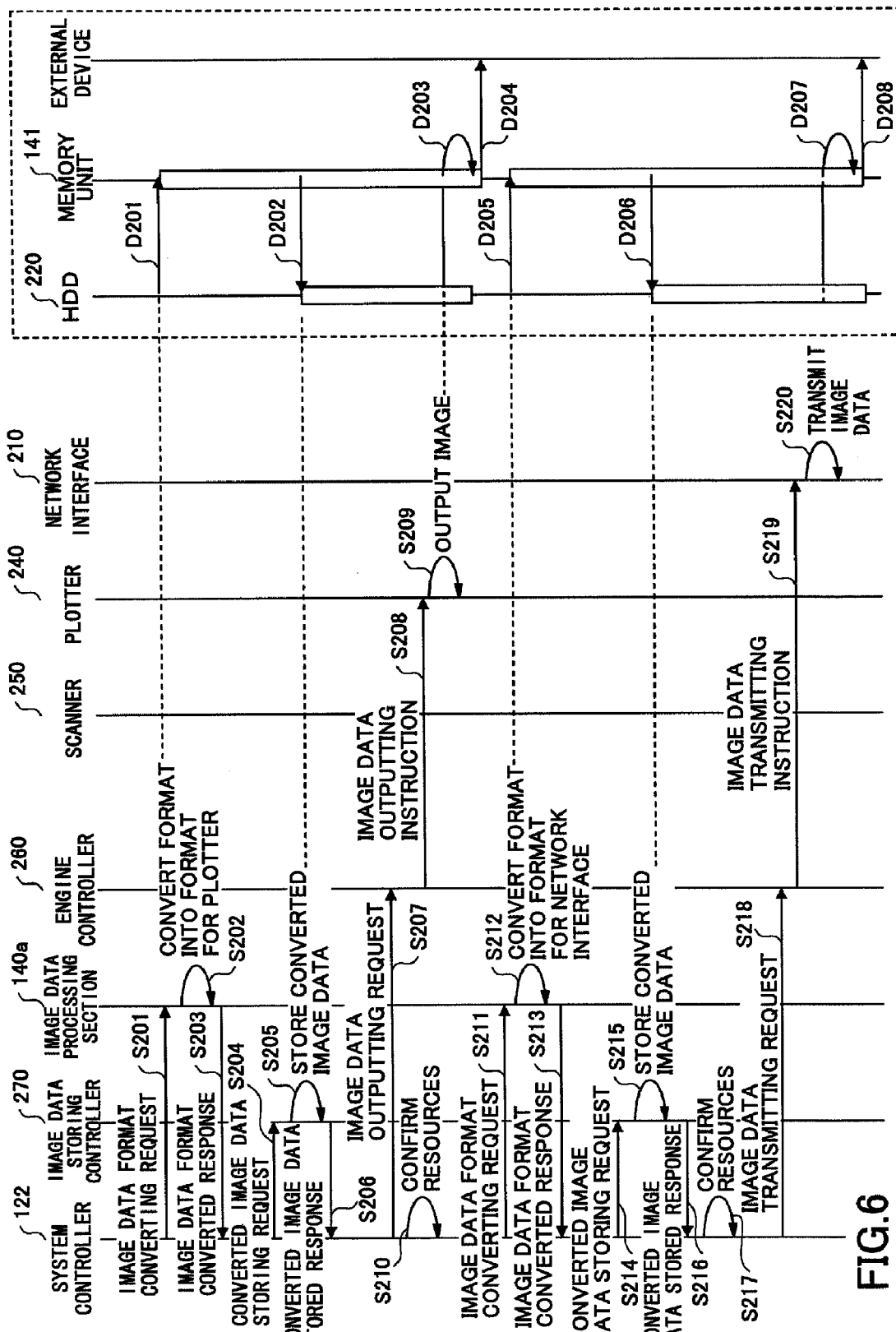
FIG. 6 is a sequence chart showing image data writing processes and image data network transmitting processes in the image forming apparatus according to the embodiment of the present invention.

FIG. 6 is a sequence chart showing image data writing (plotting) processes and image data network transmitting processes in the image forming apparatus 1. In FIG. 6, image data stored in the HDD 220 are output to the plotter 240 and the network interface 210. The processes shown in FIG. 6 can be executed after the processes S101 through S108 shown in FIG. 5. In this case, an image is read (scanned) by the scanner 250, and image data of the read image are output by the plotter 240 and are transmitted via the network interface 210. In addition, in FIG. 6, a part surrounded by a dashed line shows image data transferring processes.

Referring to FIG. 6, the image data plotting processes and the image data network transmitting processes are described.

First, the system controller 122 requests the image data processing section 140a to convert the image data of the predetermined format into image data of a format for the plotter 240 (S201). The image data processing section 140a converts the image data of the predetermined format into the image data of the format for the plotter 240 (S202). In detail, the output image data converting unit 145 in the image data processing section 140a converts the image data of the predetermined format into the image data of the format for the plotter 240. The format of the image data for the plotter 240 is, for example, a format which uses a color space expressed by four colors CMYK. In S202, the image data stored in the HDD 220 are transferred or copied to the memory unit 141 (D201).

The image data processing section 140a sends an image data format converted response signifying that the format conversion is completed to the system controller 122 (S203).

The system controller 122 sends a converted image data storing request to the image data storing controller 270 so that the converted image data are stored in the HDD 220 (S204). The image data storing controller 270 makes the HDD 220 store the converted image data (S205). That is, the image data storing controller 270 transfers or copies the converted image data stored in the memory unit 141 to the HDD 220 (D202). The memory area where the converted image data have been stored in the memory unit 141 can be a free memory area.

The image data storing controller 270 sends a converted image data stored response, which signifies that the converted image data are stored in the HDD 220, to the system controller 122 (S206).

The system controller 122 sends an image data outputting request to the engine controller 260 so that the image data of the converted format are output (S207). The engine controller 260 sends an image data outputting instruction, which instructs the plotter 240 to output the image data, to the plotter 240 (S208). In detail, the controlling unit for the plotter 240 in the engine controller 260 sends the image data outputting instruction to the plotter 240.

The plotter 240 forms an image on a recording medium by using the image data (S209). That is, the image data stored in memory unit 141 are printed on a recording medium by the plotter 240 (D204). When the image data are not stored in the memory unit 141 by having been transferred to the HDD 220 in D202, the image data are transferred to the memory unit 141 from the HDD 220 (D203), and the image data are printed on a recording medium by the plotter 240 (D204).

As described above, by the processes from S201 through S209, an image is formed on a recording medium by the plotter 240.

Next, the image data network transmitting processes are described. The image data network transmitting processes can be executed without synchronizing with the image data writing processes described in S201 through S209.

First, the system controller 122 executes a resource confirming process (S210). In the resource confirming process, it is confirmed whether a memory area for a format converting process is obtained in the memory unit 141 so that the image data of the predetermined format are converted into image data of a network transmitting format.

Figure 7:
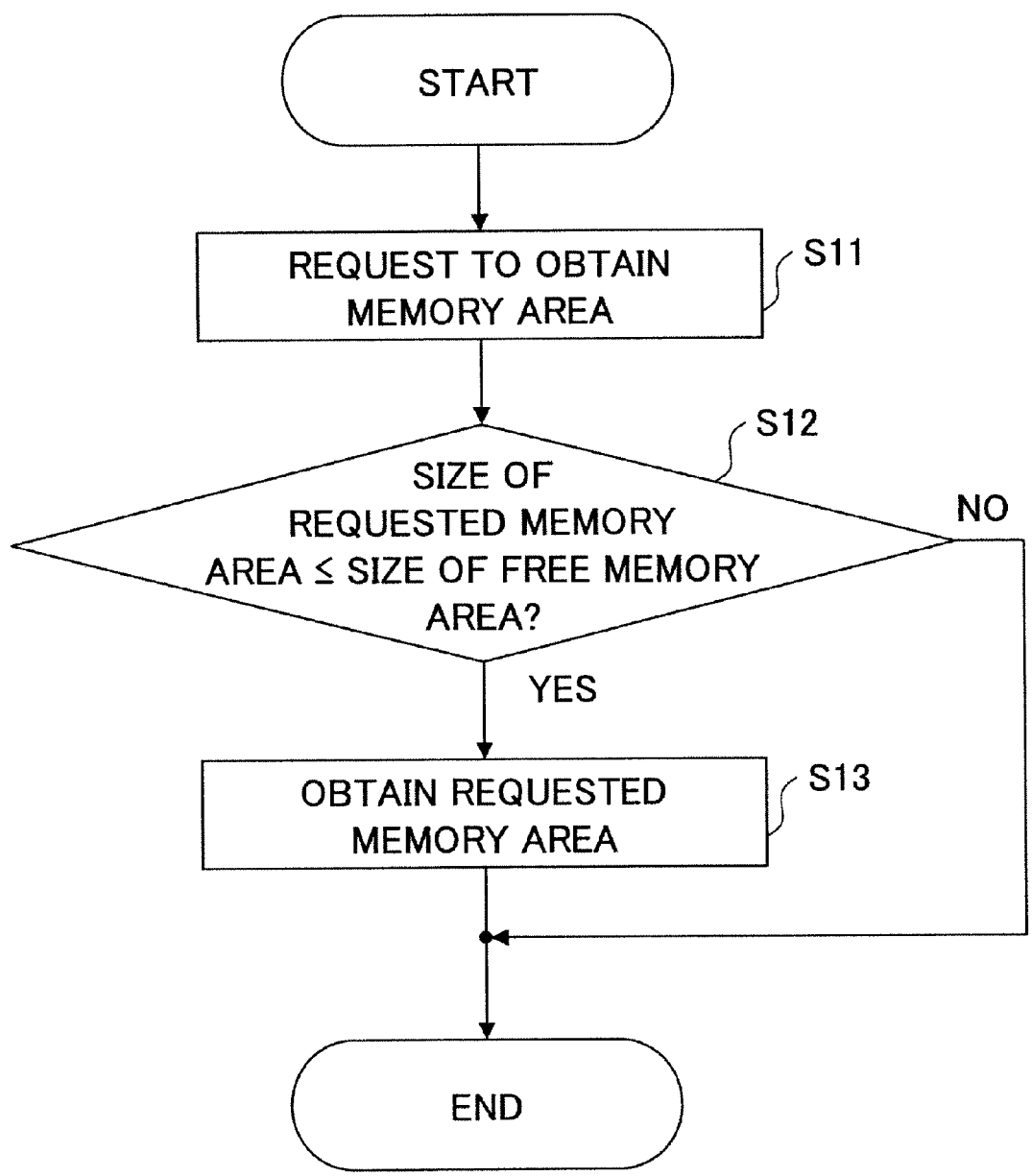
FIG. 7 is a flowchart showing a resource confirming process shown in FIG. 6.

Referring to FIG. 7, the resource confirming process is described. FIG. 7 is a flowchart showing the resource confirming process. First, the system controller 122 sends a memory area obtaining request to the memory area adjusting unit 142 (FIG. 3) which controls the memory unit 141 (S11). The memory area adjusting unit 142 compares the size of a free memory area in the memory unit 141 with the size of the requested memory area, and determines whether the size of the requested memory area is equal to or less than the size of the free memory area (S12).

When the size of the requested memory area is equal to or less than the size of the free memory area (YES in S12), the memory area adjusting unit 142 obtains the requested memory area in the memory unit 141 (S13). The memory area adjusting unit 142 can send a memory area obtained response to the system controller 122.

When the size of the requested memory area is greater than the size of the free memory area (NO in S12), the system controller 122 ends the resource confirming process.

Again, in FIG. 6, after confirming that the requested memory area is obtained, the system controller 122 requests the image data processing section 140a to convert the image data of the predetermined format into the image data of the network transmitting format (S211).

The image data processing section 140a converts the image data of the predetermined format into the image data of the network transmitting format (S212). In detail, the output image data converting unit 145 in the image data processing section 140a converts the image data of the predetermined format into the image data of the network transmitting format. The network transmitting format is, for example, a PDF file format, a TIFF format, or a JPEG format. In S212, the image data stored in the HDD 220 are transferred or copied to the memory unit 141 (D205).

The image data processing section 140a sends an image data format converted response signifying that the format conversion is completed to the system controller 122 (S213).

The system controller 122 sends a converted image data storing request to the image data storing controller 270 so that the converted image data are stored in the HDD 220 (S214). The image data storing controller 270 makes the HDD 220 store the converted image data (S215). That is, the image data storing controller 270 transfers or copies the converted image data being stored in the memory unit 141 to the HDD 220 (D206). The memory area where the converted image data have been stored in the memory unit 141 can be a free memory area.

The image data storing controller 270 sends a converted image data stored response, which signifies that the converted image data are stored in the HDD 220, to the system controller 122 (S216).

The system controller 122 executes a resource confirming process (S217). In the resource confirming process, it is confirmed whether a memory area for an image data network transmitting process is obtained in the memory unit 141 for transmitting the image data via a network. In the resource confirming process, a process similar to the process shown in FIG. 7 is executed.

The system controller 122 sends an image data transmitting request, which requests to transmit image data via a network, to the engine controller 260 (S218). The engine controller 260 sends an image data transmitting instruction to the network interface 210 so that the network interface 210 transmits the image data to an external device (S219). In detail, the controlling unit for the network interface 210 in the engine controller 260 sends the image data transmitting instruction to the network interface 210.

In the image data network transmitting processes, the image data are transmitted to an external device, for example, a PC by attaching the image data to e-mail, or are directly transmitted to the PC, via the network interface 210.

The network interface 210 transmits the image data to the external device via a network (S220). That is, the image data in the memory unit 141 are transmitted to the external device (D208), but when the image data are not stored in the memory unit 141 by having been transferred to the HDD 220, the image data are transferred to the memory unit 141 from the HDD 220 (D207), and then the image data in the memory unit 141 are transmitted to the external device (D208).

As described above, by the processes from S210 through S220, the image data of the predetermined format stored in the HDD 220 are converted into the image data of the network transmitting format and the converted image data are transmitted to the external device via the network interface 210.

In the image data plotting processes shown in S201 through 209, the resource confirming process shown in FIG. 7 is not executed by the system controller 122. The image data plotting processes after the image data scanning process is an image data copying job, and it is desirable that the image data copying job have priority over other jobs. Generally, a job, which is executed by user operations on the operating panel of the image forming apparatus 1, is executed by having priority over other jobs. That is, the copying job has the first priority over the other jobs; therefore, the memory area in the memory unit 141 is given to the copying job with priority over the other jobs.

Since the image data network transmitting processes shown in S210 through S220 are executed without synchronizing with the image data plotting processes shown in S201 through S209, for example, even if the plotter 240 has trouble during the image data plotting processes, the image data network transmitting processes can be normally executed. With this, one job in the plural jobs can be normally executed.

[Processes when Memory Area Cannot be Obtained]

Figure 8:
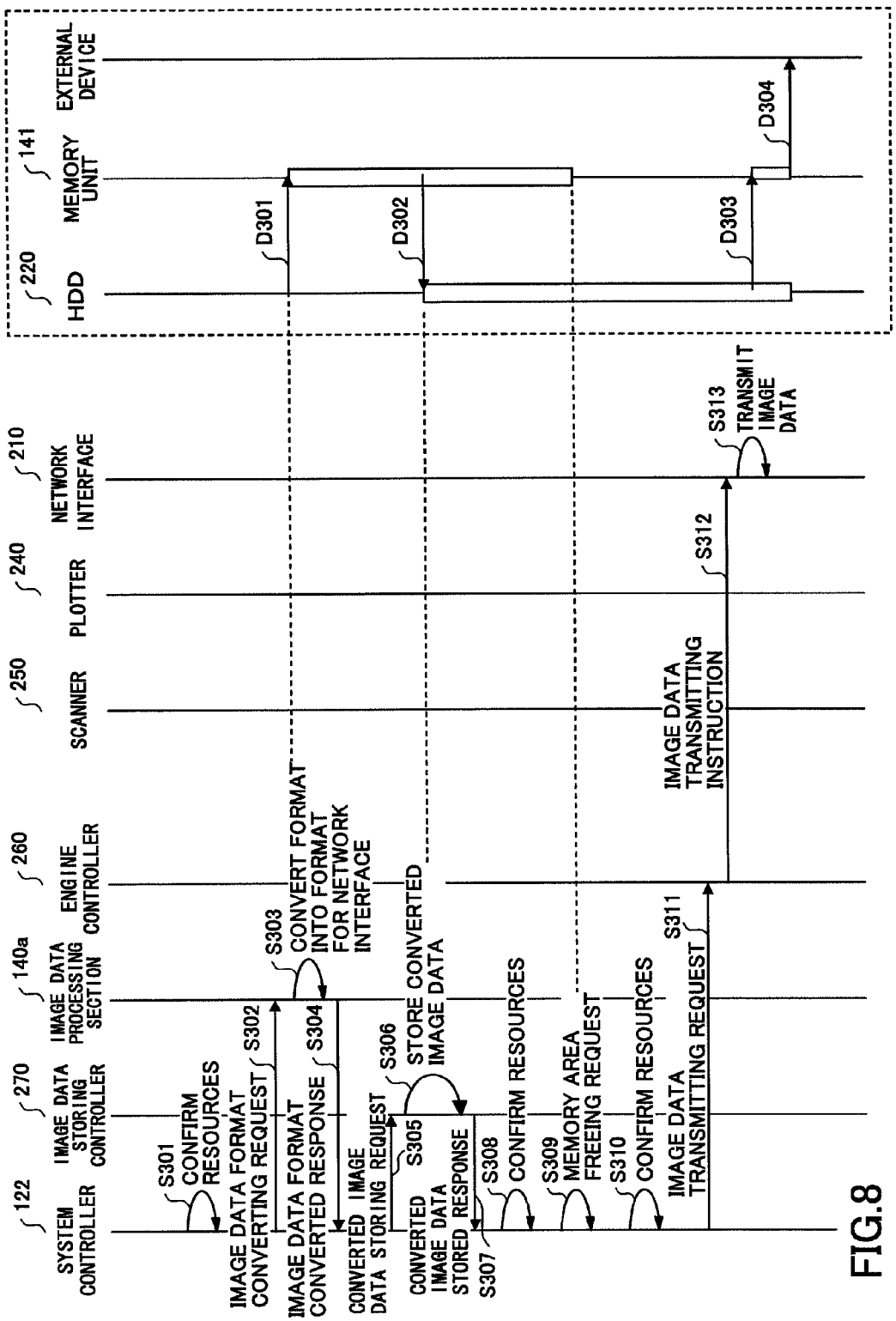
FIG. 8 is a sequence chart showing image data network transmitting processes in the image forming apparatus according to the embodiment of the present invention.

Next, referring to FIG. 8, processes are described when a memory area cannot be obtained.

FIG. 8 is a sequence chart showing image data network transmitting processes in the image forming apparatus 1. In FIG. 8, a memory area in the memory unit 141 cannot be obtained by the resource confirming process shown in FIG. 7. In addition, in FIG. 8, processes from S301 through S307 including D301 are the same as the processes from S210 through S216 including D205 shown in FIG. 6. Therefore, the same description is omitted. That is, in this case, the memory area for the format conversion is obtained; however, a memory area for image data transmission is not obtained. In addition, in FIG. 8, a part surrounded by a dashed line shows image data transferring processes.

Referring to FIG. 8, the image data network transmitting processes are described.

The system controller 122 executes a resource confirming process (S308). The resource confirming process in S308 is almost similar to the process in S210 or S217 shown in FIG. 6. However, the free memory area in the memory unit 141 is less than a memory area to be obtained. That is, a memory area cannot be obtained in the memory unit 141 when the image data converted in S306 are transmitted to an external device via the network interface 210.

In order to obtain the memory area in the memory unit 141, the system controller 122 sends a memory area freeing request to the memory area adjusting unit 142 so that a memory area is made free in the memory unit 141 (S309). The memory area to be made free is a memory area used for the format conversion in the memory unit 141 in S303. Since the converted image data are stored in the HDD 220 in S306, the converted image data in the memory unit 141 can be erased.

Figure 9:
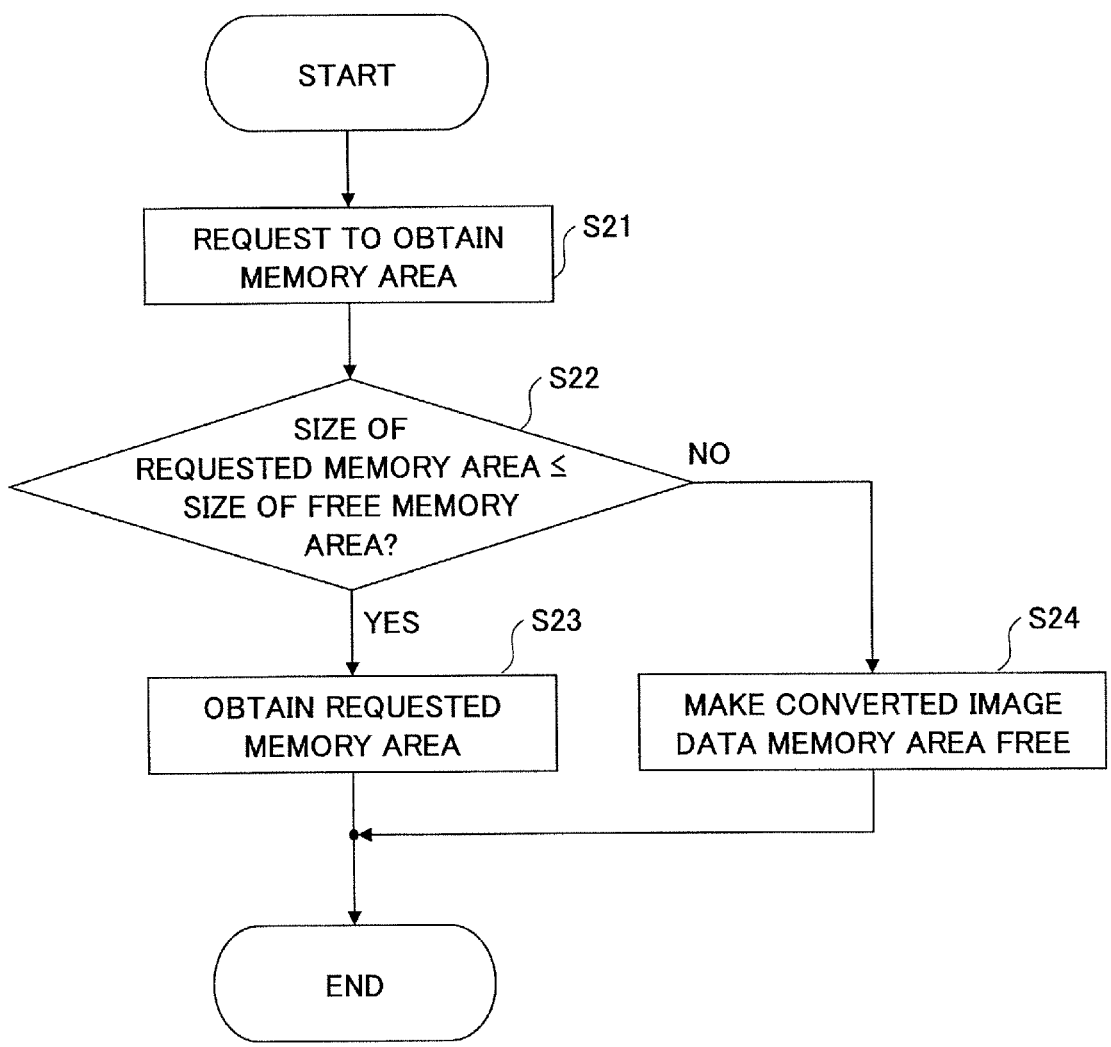
FIG. 9 is a flowchart showing a resource confirming process and a memory area freeing process shown in shown in FIG. 8.

Referring to FIG. 9, the resource confirming process and the memory area freeing process are described. FIG. 9 is a flowchart showing the resource confirming process and the memory area freeing process shown in S308 and S309 of FIG. 8.

First, the system controller 122 sends a memory area obtaining request to the memory area adjusting unit 142 (FIG. 3) which controls the memory unit 141 (S21). The memory area adjusting unit 142 compares the size of a free memory area in the memory unit 141 with the size of the requested memory area, and determines whether the size of the requested memory area is equal to or less than the size of the free memory area (S22). When the size of the requested memory area is equal to or less than the size of the free memory area (YES in S22), the memory area adjusting unit 142 obtains the requested memory area in the memory unit 141 (S23).

When the size of the requested memory area is greater than the size of the free memory area (NO in S22), the memory area adjusting unit 142 makes the converted image data memory area in the memory unit 141 free (S24). The converted image data memory area is used in S303. That is, the converted image data are transferred to the HDD 220 (D302).

In addition, when the size of the requested memory area is greater than the size of the free memory area (NO in S22), the memory area adjusting controller 142 can send a memory area unobtainable response to the system controller 122, or the system controller 122 determines that the memory area cannot be obtained when predetermined time has passed. However, when the memory area adjusting unit 142 makes the converted image data memory area in the memory unit 141 free (S24), the memory area for the image data transmission can be obtained.

The processes from S310 through S313 are almost the same as the processes in S217 through S220. Therefore, the detailed description is omitted. The image data stored in the HDD 220 are transferred or copied in the memory unit 141 (D303) and the image data in the memory unit 141 are transmitted to an external device (D304). Since the image data converted in S303 have been erased in S309, the image data stored in the memory unit 141 are transmitted to the external device via a network.

[Structure of Computer]

Figure 10:
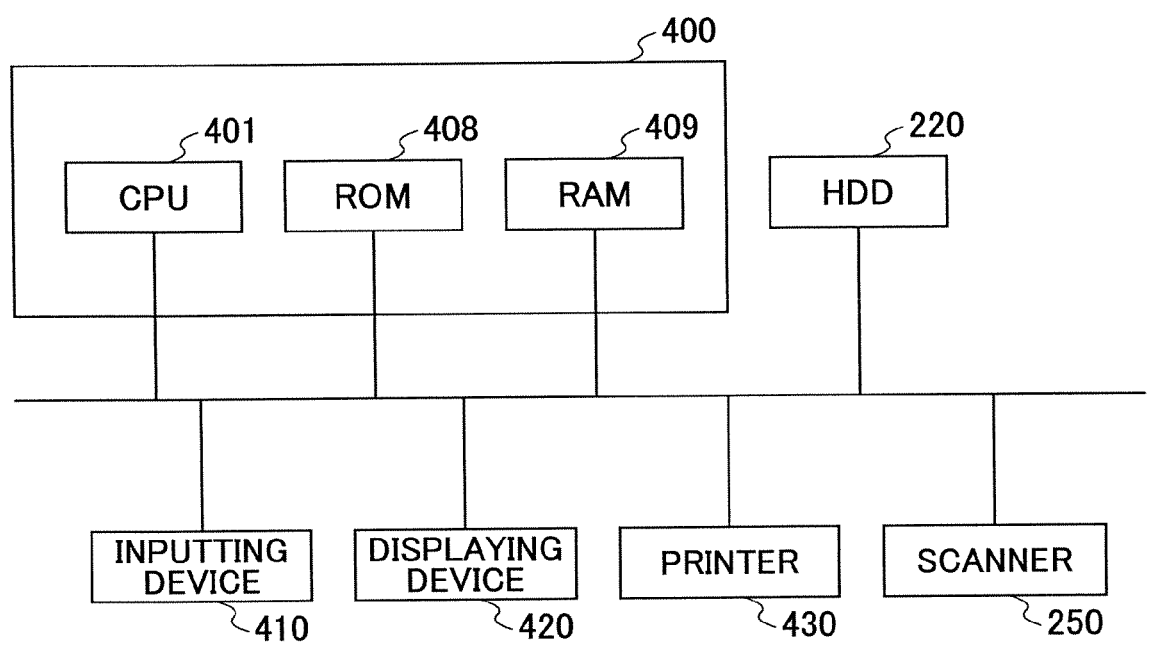
FIG. 10 is a block diagram showing a computer for executing an image forming program in the image forming apparatus according to the embodiment of the present invention.

FIG. 10 is a block diagram showing a computer for executing an image forming program in the image forming apparatus 1.

As shown in FIG. 10, the computer for executing the image forming program in the image forming apparatus 1 includes a main processing section 400, an inputting device 410, a displaying device 420, a printer 430, the scanner 250, and the HDD 220. The main processing section 400 includes a CPU 401, a ROM 408, and a RAM 409 for executing main processes in the computer. The CPU 401 reads the image forming program from the ROM 408, holds the image forming program in the RAM 409, and executes the image forming program. The ROM 408 is a non-volatile memory and stores programs such as the image forming program which is executed by the CPU 401 and parameters necessary for controlling the image forming apparatus 1. The RAM 409 is a working memory when the CPU 401 executes a program.

The inputting device 410 is, for example, a keyboard, and a user inputs an instruction by using the inputting device 410. The displaying device 420 displays, for example, operating conditions of the computer. The printer 430 forms an image on a recoding medium. The scanner 250 optically reads an image formed on a recoding medium. The HDD 220 stores a large amount of data such as image data.

The image forming program can be stored in a recording medium attached to a driving device of the recording medium in addition to the HDD 220 and the ROM 408.

Further, the present invention is not limited to the specifically disclosed embodiment, and variations and modifications may be made without departing from the scope of the present invention.

The present invention is based on Japanese Priority Patent Application No. 2006-253507, filed on Sep. 19, 2006, with the Japanese Patent Office, the entire contents of which are hereby incorporated herein by reference.

What is claimed is:

1. An image forming apparatus, comprising:
a plurality of image output units;
a plurality of output image data converting units connected to the corresponding image output units and configured to convert image data of a predetermined first format into image data of a second format compatible with the corresponding image output units;
a first memory unit shared by the output image data converting units;
a second memory unit configured to store image data;
a control unit configured to transmit a reservation request to a memory area adjusting unit;
the memory area adjusting unit which, in response to receipt of the reservation request from the control unit, handles the reservation request for the memory area in the first memory unit; and
a document storage unit configured to move or copy image data stored in the first memory unit to the second memory unit and release a memory area storing the moved or copied image data in the first memory unit,
wherein in response to the control unit failing to obtain a reservation response for the memory area in the first memory unit during a predetermined time duration beginning at a transmission of the reservation request, the control unit determines that the memory area has not been reserved.

2. The image forming apparatus as claimed in claim 1, wherein:
the memory area adjusting unit compares the size of a requested memory area by the memory area reservation request with the size of a free memory area in the first memory unit and obtains the requested memory area when the size of the requested memory area is equal to or less than the size of the free memory area.

3. The image forming apparatus as claimed in claim 1, further comprising:
a priority order storing unit which stores a predetermined priority order indicating which unit, of the image output units and the output image data converting units, will be allocated a requested memory area in response to a request; wherein
the memory area adjusting unit allocates the requested memory area to the image output unit or the output image data converting unit based on the predetermined priority order stored in the priority order storing unit.

4. The image forming apparatus as claimed in claim 1, further comprising:
a system controller for controlling the output image data converting units and the image output units in each job; wherein
the system controller requests the memory area adjusting unit to obtain a memory area in the first memory unit for the output image data converting unit, and instructs the output image data converting unit to convert the image data of the predetermined format into the image data of the format for the image output unit when the system controller receives a requested memory area obtained response from the memory area adjusting unit.

5. The image forming apparatus as claimed in claim 4, wherein
the system controller requests the memory area adjusting unit to obtain a memory area in the first memory unit for the image output unit, and instructs the image output unit to output an image when the system controller receives a requested memory area obtained response from the memory area adjusting unit.

6. The image forming apparatus as claimed in claim 5, wherein
the system controller requests the memory area adjusting unit to make the memory area used by the output image data converting unit corresponding to the image output unit free in the first memory unit when a memory area for the image output unit is not obtained in the first memory unit.

7. The image forming apparatus as claimed in claim 1, further comprising:
a second memory unit for storing the image data of the predetermined first format and the image data of the second format converted by the output image data converting units.

8. The image forming apparatus as claimed in claim 1, wherein
each of the output image data converting units independently converts the image data of the predetermined first format.

9. The image forming apparatus as claimed in claim 1, wherein
each of the image output units is a plotter, a facsimile machine, an e-mail transmitting device, or a data transmitting device.

10. The image forming apparatus as claimed in claim 1, further comprising:
a plurality of image input units; and
a plurality of input image data converting units connected to the corresponding image input units and configured to convert input image data into the image data of the predetermined first format; wherein
the first memory unit commonly stores the image data used in processes by the input image data converting unit and the image input units.

11. An image forming method in an image forming apparatus which includes a plurality of image output units, a plurality of output image data converting units connected to the corresponding image output units, a first memory unit shared by the output image data converting units, a second memory unit configured to store image data, a control unit, a memory area adjusting unit, and a document storage unit, comprising:
converting, using the respective output image data converting unit, image data of a predetermined first format into image data of a second format compatible with the respective image output unit;
transmitting, using the control unit, a reservation request to the memory area adjusting unit;
in response to receipt of the reservation request from the control unit, handling, using the memory area adjusting unit, the reservation request for the memory area in the first memory unit;
moving or copying, using the document storage unit, image data stored in the first memory unit to the second memory unit and releasing a memory area storing the moved or copied image data in the first memory unit; and
in response to the control unit failing to obtain a reservation response for the memory area in the first memory unit during a predetermined time duration beginning at a transmission of the reservation request, determining, using the control unit, that the memory area has not been reserved.

12. The image forming method as claimed in claim 11, further comprising:
a memory area requesting step of requesting the memory area adjusting unit to obtain a memory area in the first memory unit for converting the image data of the predetermined first format into the image data of the second format for the image output unit by a system controller in the image forming apparatus which controls the output image data converting units and the image output units in each job; and an image data conversion instructing step of instructing the output image data converting unit to convert the image data of the predetermined first format into the image data of the second format for the image output unit when the system controller receives a requested memory area obtained response from the memory area adjusting unit.

13. The image forming method as claimed in claim 12, further comprising:
 a memory area requesting step of requesting the memory area adjusting unit to obtain a memory area in the first memory unit for the image output unit by the system controller; and
 an image data output instructing step of instructing the image output unit to output an image when the system controller receives a requested memory area obtained response from the memory area adjusting unit.

14. The image forming method as claimed in claim 12, further comprising:
 a converted image data storing step of storing the image data of the predetermined first format and the image data of the second format converted by the output image data converting unit for the image output unit in a second memory unit by the system controller.

15. The image forming method as claimed in claim 11, further comprising:
 a memory area requesting step of requesting the memory area adjusting unit to obtain a memory area in the first memory unit for image data input from a plurality of image input units in the image forming apparatus for converting the input image data into the image data of the predetermined first format.

16. A non-transitory computer-readable recording medium storing an image forming program in an image forming apparatus which includes a plurality of image output units, a plurality of output image data converting units connected to the corresponding image output units, a first memory unit shared by the output image data converting units, a second memory unit configured to store image data, a control unit, a memory area adjusting unit, and a document storage unit, the image forming program causes the computer to perform the method comprising:
 converting image data of a predetermined first format into image data of a second format for the image output unit;
 transmitting, using the control unit, a reservation request to the memory area adjusting unit;
 in response to receipt of the reservation request from the control unit, handling, using the memory area adjusting unit, the reservation request for the memory area in the first memory unit;
 moving or copying, using the document storage unit, image data stored in the first memory unit to the second memory unit and releasing a memory area storing the moved or copied image data in the first memory unit; and
 in response to the control unit failing to obtain a reservation response for the memory area in the first memory unit during a predetermined time duration beginning at a transmission of the reservation request, determining, using the control unit, that the memory area has not been reserved.

17. The non-transitory computer-readable recording medium storing the image forming program as claimed in claim 16,
further comprising:
 a memory area requesting step of requesting the memory area adjusting unit to obtain a memory area in the first memory unit for converting the image data of the predetermined first format into the image data of the second format for the image output unit by a system controller in the image forming apparatus which controls the output image data converting units and the image output units in each job; and
 an image data conversion instructing step of instructing the output image data converting unit to convert the image data of the predetermined first format into the image data of the second format for the image output unit when the system controller receives a requested memory area obtained response from the memory area adjusting unit.

18. The non-transitory computer-readable recording medium storing the image forming program as claimed in claim 17,
further comprising:
 a memory area requesting step of requesting the memory area adjusting unit to obtain a memory area in the first memory unit for the image output unit by the system controller; and
 an image data output instructing step of instructing the image output unit to output an image when the system controller receives a requested memory area obtained response from the memory area adjusting unit.

19. The non-transitory computer-readable recording medium storing the image forming program as claimed in claim 17,
further comprising:
 a converted image data storing step of storing the image data of the predetermined first format and the image data of the second format converted by the output image data converting unit for the image output unit in a second memory unit by the system controller.

20. The non-transitory computer-readable recording medium storing the image forming program as claimed in claim 16,
further comprising:
 a memory area requesting step of requesting the memory area adjusting unit to obtain a memory area in the first memory unit for image data input from a plurality of image input units in the image forming apparatus for converting the input image data into the image data of the predetermined first format.

* * * * *